US009792289B2

(12) United States Patent
Reininger et al.

(10) Patent No.: US 9,792,289 B2
(45) Date of Patent: Oct. 17, 2017

(54) SYSTEMS AND METHODS FOR FILE CLUSTERING, MULTI-DRIVE FORENSIC ANALYSIS AND DATA PROTECTION

(71) Applicant: Semandex Networks Inc., Hopewell, NJ (US)

(72) Inventors: Daniel J. Reininger, Skillman, NJ (US); Dhananjay D. Makwana, New Egypt, NJ (US); Raymond William Kulberda, Kendall Park, NJ (US); Eric Heath Larson, Freehold, NJ (US); Timothy P. Hearn, Cherry Hill, NJ (US)

(73) Assignee: Semandex Networks Inc., Hopewell, NJ (US)

(*) Notice: Subject to any disclaimer, the term of this patent is extended or adjusted under 35 U.S.C. 154(b) by 197 days.

(21) Appl. No.: 14/536,030

(22) Filed: Nov. 7, 2014

(65) Prior Publication Data

US 2016/0132521 A1  May 12, 2016

(51) Int. Cl.
*G06F 17/30* (2006.01)
*G06T 11/20* (2006.01)

(52) U.S. Cl.
CPC .. *G06F 17/30112* (2013.01); *G06F 17/30109* (2013.01); *G06T 11/206* (2013.01)

(58) Field of Classification Search
CPC ......... G06F 17/30011; G06F 17/30265; G06F 17/3071; G06F 17/30038; G06F 17/30047; G06F 17/30247; G06F 17/30598; G06F 17/30601; G06F 17/30994; G06F 3/04817; G06F 17/30109

USPC .......................... 707/737, 738, 754; 382/225
See application file for complete search history.

(56) References Cited

U.S. PATENT DOCUMENTS

| | | | |
|---|---|---|---|
| 7,779,032 B1* | 8/2010 | Garfinkel | G06F 17/30067 707/776 |
| 8,145,586 B2* | 3/2012 | Choi | G06K 9/00 706/46 |
| 8,433,959 B1* | 4/2013 | Garfinkel | G06F 3/0611 707/899 |
| 2001/0039553 A1* | 11/2001 | LaMarca | G06F 17/30011 715/234 |
| 2003/0074369 A1* | 4/2003 | Schuetze | G06F 17/3071 |
| 2005/0192924 A1* | 9/2005 | Drucker | G06F 3/0483 |
| 2008/0021896 A1* | 1/2008 | Turski | G06F 17/30106 |
| 2010/0017487 A1* | 1/2010 | Patinkin | G06Q 10/107 709/206 |

(Continued)

OTHER PUBLICATIONS

[Video] Lecture 04—Interest Point Detection Sep. 19, 2012 (<https://www.youtube.com/watch?v=_ggKQGsuKeQ>).

(Continued)

*Primary Examiner* — Dennis Truong
(74) *Attorney, Agent, or Firm* — Wilmer Cutler Pickering Hale and Dorr LLP

(57) ABSTRACT

A system and method for file clustering, multi-drive forensic analysis and protection of sensitive data. Multiple memory devices can store files. A module can extract characteristics from the stored files, identify similarities between the files based on the extracted characteristics and generate file clusters based on the identified similarities. A visual representation of the file clusters, which can be generated to show the identified similarities among the files, can be displayed by a user interface module.

23 Claims, 9 Drawing Sheets

(56) References Cited

U.S. PATENT DOCUMENTS

| | | | | |
|---|---|---|---|---|
| 2010/0138420 | A1* | 6/2010 | Bator | G06F 17/30572 707/737 |
| 2011/0211764 | A1* | 9/2011 | Krupka | G06F 17/30247 382/225 |
| 2012/0036132 | A1* | 2/2012 | Doyle | G06F 17/30038 707/738 |
| 2013/0054613 | A1* | 2/2013 | Bishop | G06F 17/30011 707/748 |
| 2013/0204886 | A1* | 8/2013 | Faith | G06Q 30/0631 707/756 |
| 2014/0195516 | A1* | 7/2014 | Balakrishnan | G06F 17/30126 707/722 |
| 2015/0026606 | A1* | 1/2015 | Hill | G06F 17/3089 715/760 |
| 2015/0154281 | A1* | 6/2015 | Carlsson | G06F 17/30604 707/754 |

OTHER PUBLICATIONS

Azgomi et al., "A Solution for Calculating the False Positive and False Negative in LSH Method to Find Similar Documents," Journal of Basic and Applied Scientific Research, vol. 3, No. 1s, pp. 466-472 (Jul. 2, 2013).

Broder et al., "Min-Wise Independent Permutation," Journal of Computer and System Sciences, vol. 60, No. 3, pp. 630-659 (No Month 2000).

Grabusts, "The Choice of Metrics for Clustering Algorithms," Proceedings of the 8th International Scientific and Practical Conference, vol. 2, 2011, 7 pages.

Leutenegger et al., "BRISK: Binary Robust Invariant Scalable Keypoints," Proceedings of the IEEE International Conference on Computer Vision, 2011, 8 pages.

No Author Listed, "Chapter 3: Finding Similar Items," pp. 73-130, retrieved online at [URL:<<http://infolab.stanford.edu/~ullman/mmds/ch3.pdf>>] on Apr. 13, 2015 (No publication date listed).

No Author Listed, "Shot Boundary Detection," 2 pages, retrieved online at [URL:<<http://dblp.kbs.uni-hannover.de/dblp/Search.action;jsessionid=786D2ABC63193A27AB50273FB4F668C6?search=&g=Shot+Boundary+Detection>>] on Apr. 13, 2015 (No publication date listed).

No Author Listed, "Shotdetect," 1 page, retrieved online at [URL:<<http://johmathe.name/shotdetect.html>>] on Apr. 13, 2015 (Jan. 24, 2015).

Rajaraman, "Near Neighbor Search in High Dimensional Data (2)," 44 pages, retrieved online at [URL:<<http://web.stanford.edu/class/cs345a/slides/05-LSH.pdf>>] on Apr. 13, 2015 (No publication date listed).

Wikipedia, "Interest Point Detection," 2 pages, retrieved online at [URL:<<http://en.wikipedia.org/wiki/Interest_point_detection>>] on Apr. 13, 2015 (Nov. 18, 2014)

Wikipedia, "Vector Space Model," 6 pages, retrieved online at [URL:<<http://en.wikipedia.org/wiki/Vector_space_model>>] on Apr. 13, 2015 (Mar. 29, 2015).

* cited by examiner

| | sherri.raw | Charlene.raw | Tiffany.raw | joe.raw | Manny.raw | helen.raw | michael.raw | moe.raw | charlie.raw |
|---|---|---|---|---|---|---|---|---|---|
| sherri.raw | 1540 | 1277 | 925 | 767 | 735 | 911 | 748 | 716 | 818 |
| Charlene.raw | 1277 | | 925 | 734 | 735 | 903 | 717 | 716 | 815 |
| Tiffany.raw | 925 | 925 | | 492 | 494 | 932 | 468 | 468 | 683 |
| joe.raw | 767 | 734 | 492 | | 852 | 480 | 752 | 720 | 395 |
| Manny.raw | 735 | 735 | 494 | 852 | | 473 | 722 | 722 | 393 |
| helen.raw | 911 | 903 | 932 | 480 | 473 | | 456 | 447 | 658 |
| michael.raw | 748 | 717 | 468 | 752 | 722 | 456 | | 781 | 384 |
| moe.raw | 716 | 716 | 468 | 720 | 722 | 447 | 781 | | 380 |
| charlie.raw | 818 | 815 | 683 | 395 | 393 | 658 | 384 | 380 | |
| David.raw | 815 | 815 | 683 | 392 | 393 | 655 | 381 | 380 | 879 |
| jeff.raw | 498 | 495 | 263 | 503 | 501 | 246 | 499 | 495 | 382 |
| Jack.raw | 494 | 494 | 263 | 499 | 501 | 242 | 495 | 495 | 378 |

Fig. 8

SYSTEMS AND METHODS FOR FILE CLUSTERING, MULTI-DRIVE FORENSIC ANALYSIS AND DATA PROTECTION

STATEMENT REGARDING FEDERALLY SPONSORED RESEARCH OR DEVELOPMENT

The present disclosed subject matter was made with United States government support under Grant No. GS-35F-0874P awarded by the Department of Defense. The United States government may have certain rights in the disclosed subject matter.

TECHNICAL FIELD

The disclosed subject matter relates to apparatus, systems, and methods for clustering, analyzing and protecting files in a distributed environment.

COPYRIGHT NOTICE

The disclosure herein contains material, which is subject to copyright protection. The copyright owner has no objection to the facsimile reproduction by anyone of the patent document or patent disclosure as it appears in the U.S. Patent and Trademark Office, patent file or records, but otherwise reserves all copyright rights whatsoever.

BACKGROUND

Organizations collect and store voluminous amounts of data in various formats and locations. To quickly and efficiently access, analyze and protect its data, organizations must implement good data classification systems. Organizing data into effective classification systems often relies on detecting areas where files form groups with similar properties. Identifying similarities between files spread across multiple memory resources in one or more different devices can be very challenging when dealing with a high-dimensional space that arises as a way of modeling datasets with many attributes. In high dimensional spaces, all objects appear to be sparse and dissimilar in many ways, which prevents common data organization strategies from being efficient. This problem is what is known as the curse of dimensionality. As the dimensionality increases, the volume of the space increases so fast that the available data becomes sparse, making it difficult to search.

In particular, in an enterprise environment, where a large corpus of files are stored on many devices (e.g., file servers, SANs, NAS devices, laptops, desktops, mole devices, flash drives and external drives), detecting similar files is a challenging problem. Compounding the problem, when dealing with files of non-trivial size, the number of characteristics, such as file content hashes, keywords and regular expression attributes, becomes large fairly quickly. Pairwise comparison of the files is not practical because calculating a complete set of similar matches is in the order of $n^2$ in time, $O(n^2)$, where n indicates the number of files.

As a result, there is a general need for an improved system and method for identifying similarities among files in various formats and devices across many locations. There is also a need for an improved system to identify and protect sensitive data. Embodiments of the disclosed subject matter are directed to detecting similarities between files stored in various formats and devices, dispersed over many locations. Further embodiments of the disclosed subject matter are directed to identifying and protecting sensitive data.

SUMMARY

The disclosed subject matter is directed to systems and methods for file clustering, multi-drive forensic analysis and protection of sensitive data. The systems and methods can include multiple memory devices storing files and at least one module configured to receive the files stored on the plurality of memory devices and extract characteristics of the stored files. Further, the systems and methods can identify similarities between the files based on the extracted characteristics and generate file clusters based on the identified similarities. In addition, the systems and methods can generate a visual representation of the file clusters showing the identified similarities among the files. The systems and methods can also include a user interface for displaying the visual representation of the file clusters. The systems and methods can further include a memory having a plurality of files and a reference set of files including sensitivity designations based on one or more characteristics of the reference set of files. Further, the systems and methods can identify and cluster the plurality of files based on similar characteristics between the files and one or more files from the reference set of files. In addition, the system and can tag one or more files with the same sensitivity designation as one or more of the files from the reference set.

BRIEF DESCRIPTION OF THE DRAWINGS

The disclosed subject matter is described with reference to the following figures, which are presented for the purpose of illustration only and are not intended to be limiting.

FIG. 8 is an example of a visual representation of a heat map matrix produced by the file clustering system of FIG. 2.

DETAILED DESCRIPTION

The subject matter of the present disclosure is directed to systems and methods for identifying similarities between files spread across multiple memory resources in one or more different devices, and connecting those file objects by creating file clusters. Once the files objects are identified and connected, the systems and methods of the subject matter of the present disclosure provides visual representations of the files to allow for the analysis of the files and their relationships.

Finding similarities between files can be based on one or more of the following methods, for example:

- Matching content hashes (e.g., MD5 content signatures or content feature hashes, such as Locality Sensitive Hashes)
- Similar keywords: (e.g., files with similar content can be identified based on clustering term vectors, as described in http://en.wikipedia.org/wiki/Vector_space_model, which is expressly incorporated herein by reference)
- Regular expressions: (e.g., email address, phone number, etc.)
- Close time of creation or other similar file metadata
- Matching exchangeable image file format (EXIF) metadata, or location information (e.g., GPS).

The subject matter of the present disclosure is further directed to systems and methods for providing mechanisms for protecting sensitive data in an enterprise environment. A reference set of files having specific sensitivity designations are provided to a processing engine. In some embodiments, the reference set can be a list containing the file name, MD5 hash of the file, and sensitivity designation. For example, 3QFY14-Financials.xls (file name), fd7acb301fea2d62b6f19ddb09bff3ae (MD5 hash), Very Sensitive (sensitivity designation); PressRelease.doc (file name), 50277513bcc7d94092ce4ee2b6591aad (MD5 has), Sensitive (sensitivity designation);

InventionDisclosure.doc (file name), 934f1814b587f57a893748eb8ea00627 (MD5 hash), Very Sensitive (sensitivity designation). The engine uses the reference set of files to identify and cluster files based on similarities between the files and one or more files from the reference set of files. Once clustered, the engine tags the files with the same sensitivity designation as one or more of the files from the references set. These tags may then be used to monitor access to the files to detect improper use or access.

Operational Concept

Figure 1:
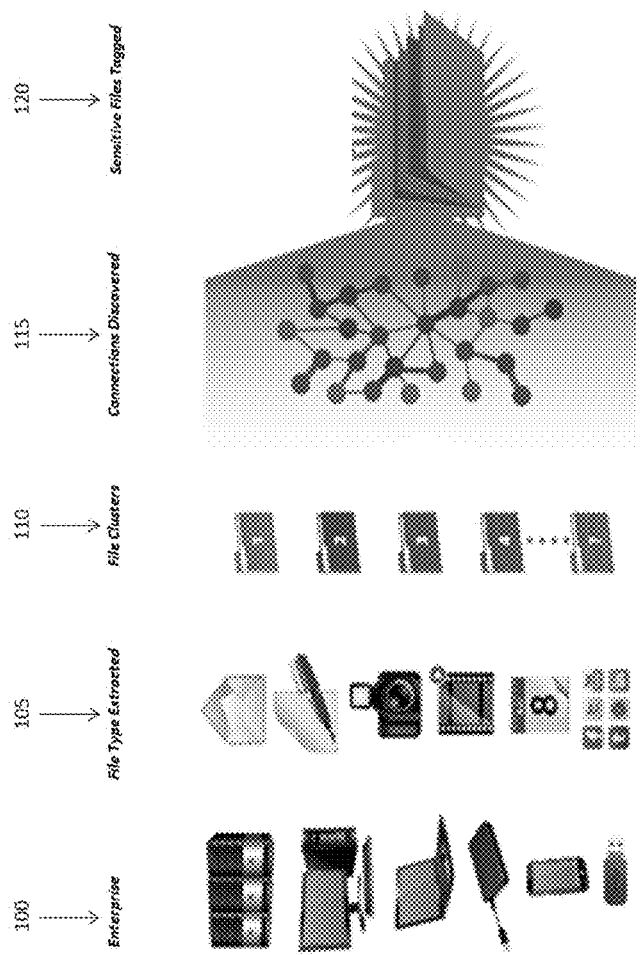
FIG. 1 illustrates an operational concept of file clustering system in accordance with some embodiments.

FIG. 1 illustrates at a high level the operational concept of tagging sensitive data, in accordance with some embodiments of the disclosed subject matter. The system, in an embodiment, copies files from a variety of devices (e.g., mounted drives)(as shown by 100) into the system for processing, computes a hash (e.g., SHA-1) for each file, extracts text from a variety of native file formats (as shown by 105), and builds file clusters based on file similarity (as shown by 110). The embodiment can support document tagging (as shown by 120) as well as various filtering and visualization options that can allow users to explore drives' contents.

At column 100, digital file storage devices are shown including but not limited to servers, desktop, laptop, external hard drives, mobile devices, and thumb drives.

Column 105 illustrates file types from which data can be extracted, including but not limited to emails, notes, photographs, videos, calendar entries, Facebook, YouTube, LinkedIn, Twitter, instant messages.

Column 110 illustrates file clusters. Files in clusters can be matched by similarity and/or associations. In some embodiments, these file clusters can be indexed and searched. The files in the clusters can retain their metadata.

The system of the present disclosure can provide the capability to tag files and propagate these tags to the file's parent cluster. This capability can help users find files that are similar to files that have been tagged by other users. For example, if one user tags certain files as important, by propagating these tags to other file collections, another user can find similar files in its own file collections. Further, by filtering on specific tags, for example, "Planning," users can be guided to files similar to files already tagged. Tags can be displayed in the file details Links between devices that contain similar files can be displayed via a graph (e.g., as shown in FIG. 1, at Column 115) including edges and nodes, or other visual representations. Users can filter the graph by filtering graph edges and eliminating clusters. Clusters can be tagged based on the tags of the files in the cluster. Filters supported by the subject matter of the present disclosure can be both inclusive (e.g., file must include tag "X") and exclusive (e.g., file cannot include tag "Y").

Column 115 illustrates a graph of devices sharing similar files. The devices appear as nodes and the edges linking the nodes illustrate similarity between files on these devices. The thickness of the edges linking two nodes can connote the degree of similarity between files on the linked nodes (e.g., a thick edge can connote a high degree of similarity, while a thin edge can connote a low degree of similarity).

Column 120 shows results of files tagged according to a certain criteria (e.g., sensitive files). A user can train the system of the disclosed subject matter to identify files to tag. For example, files that contain key words like "privileged," can be tagged as sensitive.

Figure 2:
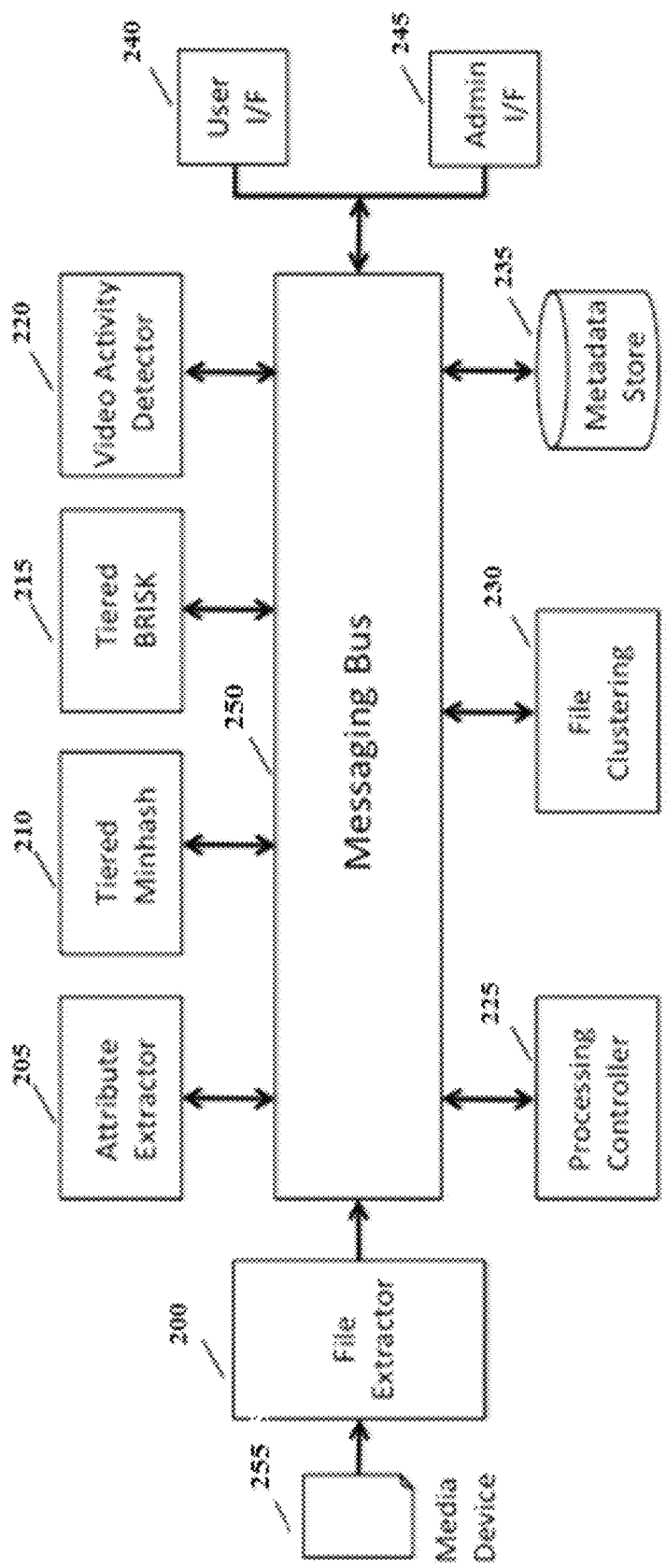
FIG. 2 illustrates file clustering system modules in accordance with some embodiments.

In some embodiments, the system can be comprised of multiple modules operating in a pipeline, as shown in FIG. 2. A file extractor 200 extracts files from a media device 255 and communicates those files to an attributes extractor 205 through a messaging bus 250. For example, an MD5 extractor can generate an MD5 hash (i.e., a MD5 message-digest algorithm that is a widely used cryptographic hash function producing a 128-bitan from a source file). The attribute extractor 205 parses the file content to extract regular strings such as email addresses, phone numbers, and a file metadata extractor retrieves metadata such as file name, size and time stamps. A processing controller 225 determines the sequence of processes through the processing pipeline (e.g., the order of processing of the file). Depending on the file type, different modules of the system can be selected to process the files. File processing algorithms also can be added to the system.

For text files, according to one embodiment, the Tiered Minhash module 210 will run a tiered Minhash algorithm. The Minhash algorithm is described in Broader, A. Z. Charikar, M. Frieze, A. M. and Mitzenmacher, Min-wise independent permutation, Journal of Computer and System Sciences, 2000, 60(3), 630-659, which is expressly incorporated herein by reference. A tiered Minhash algorithm is applied by the Tiered Minhash module 210 to identify and cluster similar files in two stages. In the first stage, the Tiered Minhash module 210 can use a class of file similarity algorithms (e.g., Minhash) that cluster near similar files and reject widely different files. For example, some embodiments can use a hashing function (e.g., a Minhash signature) of the text files (e.g., documents). Further, the Tiered Minhash module 210 can also apply a Locality Sensitive Hashing (LSH) algorithm, in conjunction with the Minhash algorithm, to compare Minhash signatures efficiently. The LSH algorithm is described in http://web.stanford.edu/class/cs345a/slides/05-LSH.pdf, which is expressly incorporated herein by reference. In the LSH method, there is a possibility for the emergence of false positives and false negatives. To reduce false positives and false negatives, the processing engine can use additional techniques to compute document similarity that work in concert with Minhash signatures. These additional techniques are described in Azgomi, H. and Mahjur A., "A Solution for Calculating the False Positive and False Negative in LSH Method to Find Similar Documents", Journal of Basic and Applied Scientific Research., 3 (1s) 466-472, 2013, http://www.textroad.com/Old%20Version/pdf/JBASR/J.%20Basic.%20Appl.%20Sci.%20Res.,%203(1s)466-472,%202013.pdf, which is expressly incorporated herein by reference. This first stage is likely to result in many false positives.

In the second stage, the Tiered Minhash module 210, can apply the Term Vector Similarity algorithm. To compute term vectors, the processing engine can index the files and find the list of terms in the "content" field across the index. These terms can represent the entries in the file vector for a file. Then for the file that the processing engine considers for similarity computation, the processing engine can extract its term vector. The term vector can generate two arrays, an array of terms within a file, and a corresponding frequency of each term in the array in that file. Using the aforementioned data structures, the processing engine can construct a file vector representing the file(s). Once the processing engine has constructed more than one file vector, the engine can compute the similarity between the files using a measure of similarity (e.g., cosine similarity). Other similarity algorithms may be used. These additional similarity algorithms are described in http://zdb.ru.lv/conferences/3/VTR8_II_70.pdf which is expressly incorporated herein by reference.

Further, in the second stage, the Tiered Minhash module 210 can also use the cosine similarity between term vectors. The second stage is a pairwise comparison among the files clustered in the first phase after the Minhash algorithm is applied. By doing the intensive pairwise comparison only within a cluster of files determined to be similar in the first stage by the Minhash algorithm, the system can be simultaneously fast and accurate (reduce false positives). False positives are naturally introduced by applying the Minhash algorithm, because many files can have matching hashes, but do not have similar content. Nevertheless, the Minhash algorithm does a good job detecting near duplicates when using no less than 5 hashes (10, 15 and 20 hashes are better but take more time). In some embodiments, the system also has a mechanism that increases the number of hashes computed on the files depending on the criticality, rarity or importance of the file.

When the Tiered Minhash module 210 applies the Minhash algorithm to compare two text files for near duplicate similarity with 5 hashes the following thresholds can be configured to determine similarity:

If the two files share 0 hashes, they are very likely not similar and can be regarded as such.
If the two files share at least 2 hashes, they are very likely similar and can be regarded as such.
If the two files share exactly 1 hash, they may or may not be similar.

The same criteria applies when using 10 Minhash signatures. However, in that case, the two files have to share more than 3 hashes to be a definite match. The larger the number of hash matches, the higher the degree of similarity. Given a tiered Minhash run with N hashes, if a pair of documents has a score of N-1 then they can be considered nearly identical. A low similarity score between the pairs (low number of hash matches), indicates that the pair only has some sentences/paragraphs in common.

In some embodiments during the extract phase of the Tiered Minhash algorithm, the following hashes are extracted from each document:
1) A 5-hash Minhash signature
2) A 10-hash Minhash signature
3) A 25-hash Minhash signature
4) A Term Vector.

The 5-hash Minhash signatures can all be stored in the metadata store 235. The 10-hash and 25-hash Minhash signatures can have their own data structure, with r=1 and b=5, 10, or 25. Hashing algorithms to find similar items, including the LSH algorithm and its use in conjunction with the Minhash algorithm is described in http://infolab.stanford.edu/~ullman/mmds/ch3.pdf, which is expressly incorporated herein by reference.

The File Extractor module 200 extracts files from the media device 255. Each extracted file is processed by the Attribute Extractor 205 and then depending on what type of file it is, it can be processed by either Tiered Minhash module 210 if the files is a text file, Tiered BRISK module 215 if the file is an image, or Video Activity Detector 220 if the file is a video file. The file attributes and hashes are then processed by the File Clustering module 230. The File Clustering module 230 compares the outputs from the modules 210, 215, and/or 220 and populates a graph data structure where the nodes represent the media devices and weighted edges represents the number of clusters with similar files. The tiered Minhash algorithm for comparing one file to a cluster includes the following steps:

1) Decide if document is tagged 'important', 'very important', or 'critically important'. If 'important' use 5 hashes, if 'very important' use 10, if 'critically important' use 25.
2) Find the Minhash signature and term vector for the query document.
3) Find all signatures that have at least 1 match to the query document's signature, using the data structure described above.
4) For each signature, which has more than either 1, 2 or 4 hash matches, when using 5, 10 or 25 hashes respectively, assign it a score equal to the number of matches in the signature.
5) For each signature that has fewer or equal to either 1, 2 or 4 hash matches when using 5, 10 or 25 hashes respectively, compute the normalized term-vector score of that document and the query document. If the score is greater than 20 then score these documents according to the number of matches they have: If not, set the score equal to 0 (they are not similar).
6) Return all documents in descending order of score.

If the file is an image, the system can use a Tiered BRISK module 215. Image similarity assessment is often done by comparing interest points, as described in the presentation featured on https://www.youtube.com/watch?v=_qgKQGsuKeQ, which is expressly incorporated herein by reference. Usually these interest points are associated with corners or intersecting lines, or curvature changes in boundaries. Interest points are described in http://en.wikipedia.org/wiki/Interest_point_detection, which is expressly incorporated herein by reference.

In some embodiments, the Tiered Brisk module 215 can apply a tiered BRISK algorithm in two stages: first, it computes the BRISK algorithm to extract features of the image and encode it into binary descriptors. A common size for the BRISK descriptors is 512 bits. The binary descriptors are segmented into sets of bit samples, for example 64 bits in size. Sets of bit samples are then combined in a methodology similar to that used in the Minhash in order to create structures of multiple descriptors for matching using the LSH algorithm. The BRISK algorithm is described in an article by Leutenegger, Stephen et al. "BRISK: Binary Robust Invariant Scalable Keypoints" (http://www.robots.ox.ac.uk/~vgg/rg/papaers/brisk.pdf), which is expressly incorporated herein by reference. The BRISK algorithm applies to grayscale translations of images thereby limiting sensitivity to color changes. The BRISK algorithm is also robust to geometry changes. Because the algorithm takes samples of local regions it is not affected by cropping.

When comparing and matching similar files, false positives can occur. False positives are eliminated by comparing a threshold value to the cosine distance of the term vectors of the candidate pairs. While this is effective in general it has the disadvantage of rejecting matches that occur from excerpts of one document included in another document. To mitigate missing those cases the Tiered Minhash module 210 can be configured to compare term vectors for partial sections (e.g., paragraphs), instead of entire documents.

If the file is a video, the embodiment will run a Video Activity Detector module 220. The Video Activity Detector 220 takes a sequence of the video based on the scene activity and extracts key frames. The key frames are used for detecting image similarity. The Video Activity Detector module 220 can apply the SHOTDETECT algorithm. Other algorithms may be used as well. This algorithm is described in http://johmathe.name/shotdetect.html, which is expressly incorporated herein by reference. However, the known implementation is prone to false positives and improvements are used by the Video Activity Detector module 220 that combines techniques such as high granularity analysis of video compression motion vectors. Some of these variations are described in http://dblpti.kbs.uni-hannover.de/dblp/Scarch.action:jsessionid=786D2ABC63193A27AB50273 FB4F668C6?search=&q=Shot+Boundary+Detection, which is expressly incorporated herein by reference.

A metadata store 235 can be used to store all hashes, attributes and clustering information computed for processed files by the various modules of the system.

User interface (I/F) 240 combines similar outputs from the different processors into one for visualization, and can allow for discovering of non-obvious associations between files. In an embodiment, the User I/F 240 can perform a link analysis between nearly identical or similar files, and, for example, identify who were the senders and who were the recipients of these files. In some embodiments, when used for example, for legal investigation applications, the processing engine can provide the connections between file originators and the people they shared the evidentiary files with. These associations can be displayed visually (e.g., in a graph).

The User I/F 240 allows users to filter clusters based on file metadata including, but not limited to file types, dates, inclusion and exclusion lists, containing certain search terms or attributes (e.g., credit card numbers), and keywords. Embodiments of the User I/F 240 can:

- Search and filter files, or provide search and file filter capabilities to a user, based on a variety of extracted and/or generated metadata, which can identify files and associations of interest.
- Identify and tag files, or provide such capabilities to a user, found in the NIST National Software Reference Library (NSRL) reference database. Identifying and tagging files can help users skip known files, save indexing time and reduce the occurrence of false positives.
- Add custom reference datasets, or provide such capabilities to a user, including files with unusual properties (e.g., abnormally large or small files, files updated at unusual times, encrypted, password protected, or empty files).

Visual analysis by an embodiment of the system can include various search modes. For example, N:N, where the user selects N media drives and the system finds similarities among files stored on all N drives. The 1:N model allows the user to select a primary drive and search for similarities between the primary drive and any of the N drives selected. A discovery mode allows users to select one drive and search all drives previously processed by the system for similarities.

In an embodiment, a search function that operates at the file level independently of the clusters can act as a filter, and reduce the number of clusters visible to the user and/or the number of files within a cluster. A search engine is used to index file names, file metadata including descriptions of the file content and file attributes and key terms in the metadata store 235. Only files and file attributes matching the search criteria will be returned. The search engine can be native to the Metadata Store 235 or an external search engine module can be added to index the Metadata Store.

Figure 6:
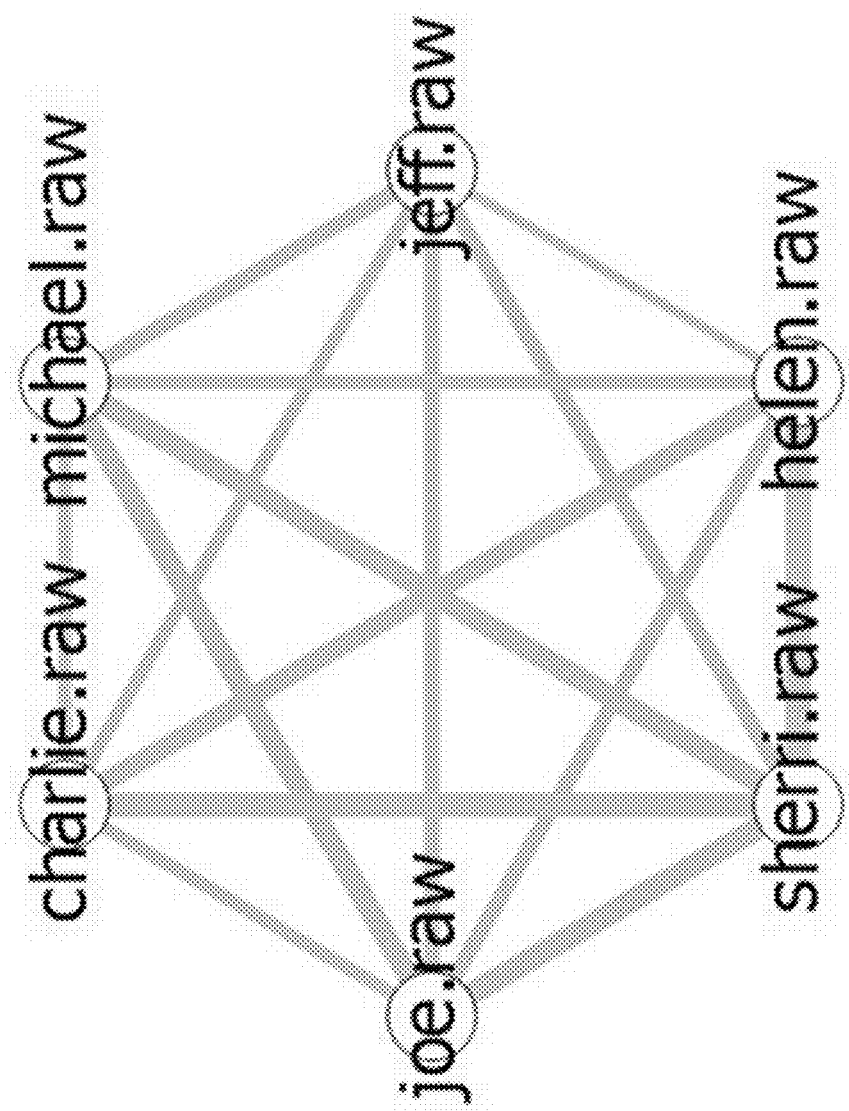
FIG. 6 is an example of a visual representation of a graph produced by the file clustering system of FIG. 2.
Figure 7:
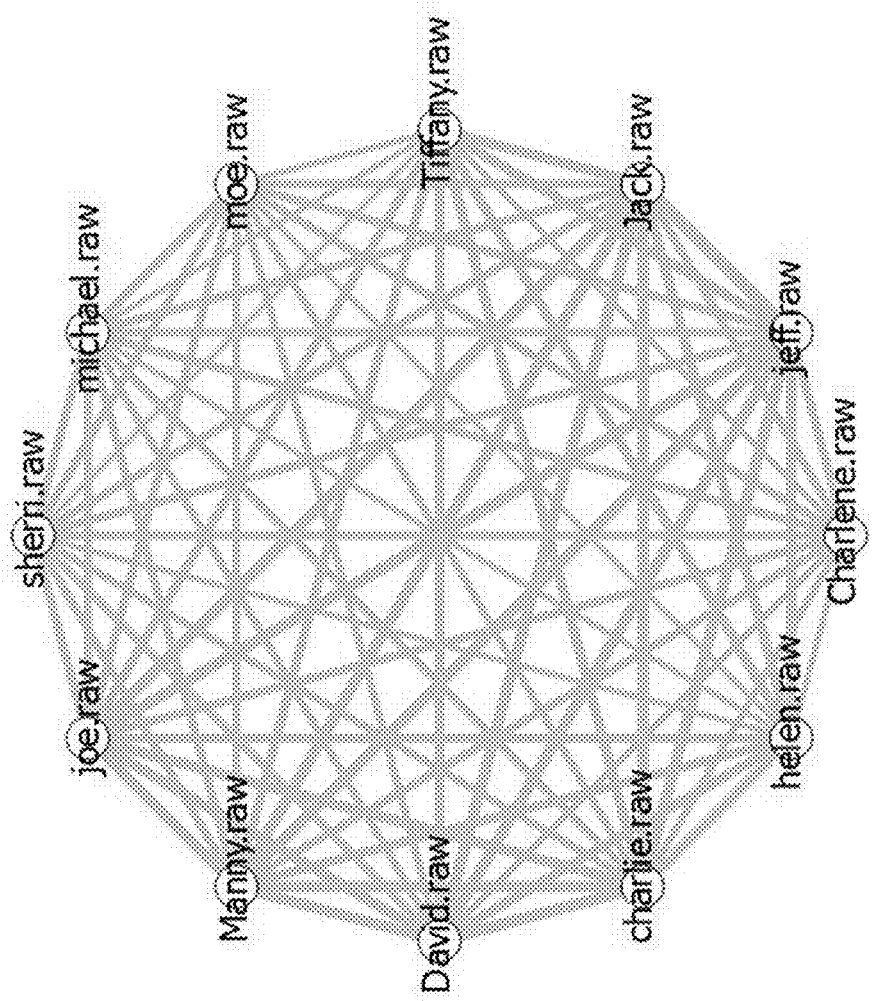
FIG. 7 is an example of a visual representation of a graph produced by the file clustering system of FIG. 2.
Figure 9:
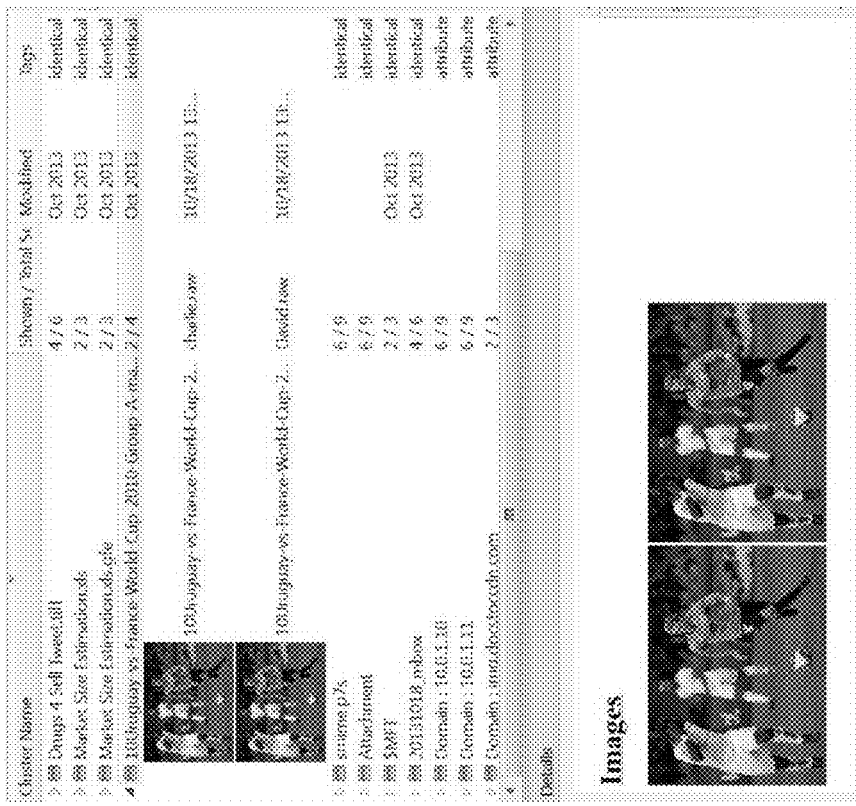
FIG. 9 is an example of a visual representation produced by selecting an object on a graph produced by the file clustering system of FIG. 2.

An embodiment of the system enables users to visualize their device data using lists, graphs, charts and other formats. For example, FIG. 6 shows an example of a visual representation in the form of a graph produced by the file clustering system of FIG. 2 showing six media drives, represented by circles. The links represent the cluster of shared similar files among the drives. The thicker the lines, the more clusters in common between the linked drives. The visual representation is scalable to large number of drives. An example with 12 drives is shown in FIG. 7. The user can click on any link and visualize the names and other information of the clusters and files shared. An example is shown in FIG. 9. Another visualization of clusters shared among many drives is a heat map matrix as shown in FIG. 8. Users can also add their own tags or other metadata to assist the file clustering system with future examinations.

In an embodiment, the system ranks clusters based on scores assigned to files or attributes in the cluster. Rare files and attributes can score higher than common ones (those appearing in many media drives). Concerning files or files known to contain sensitive information also score higher than files known not to be of concern. Files with unusual properties, such as matching the name of other files but having differing sizes also score higher. Clusters scoring above a certain threshold can be designated and tagged "high-value clusters."

A filtering mechanism can help reduce the number of clusters and produce user-friendly visualizations. For example, the filtering mechanism can select files of a certain type (e.g., images, word processing documents, emails, multimedia), time window and file tags (e.g., "Known File" "User Created" "Deleted" or "Interesting").

Admin I/F 245 can be used to allow an operator to process a plurality of media devices and submit each media as a job to the processing pipeline of the file clustering system shown in FIG. 2. Each job can have a processing manifest describing which modules to use for files and file types in the media device. For example, the processing manifest can specify to run the Tiered BRISK module 215 only on images that have low prevalence (e.g., rare pictures), or run all algorithms on recently accessed files, but only run certain new algorithms recently added to the processing pipeline on older files. This provides for a flexible file clustering system where the administrator can pick and choose which algorithms to run to achieve the desired results in terms of processing speed and clustering accuracy.

Figure 3:
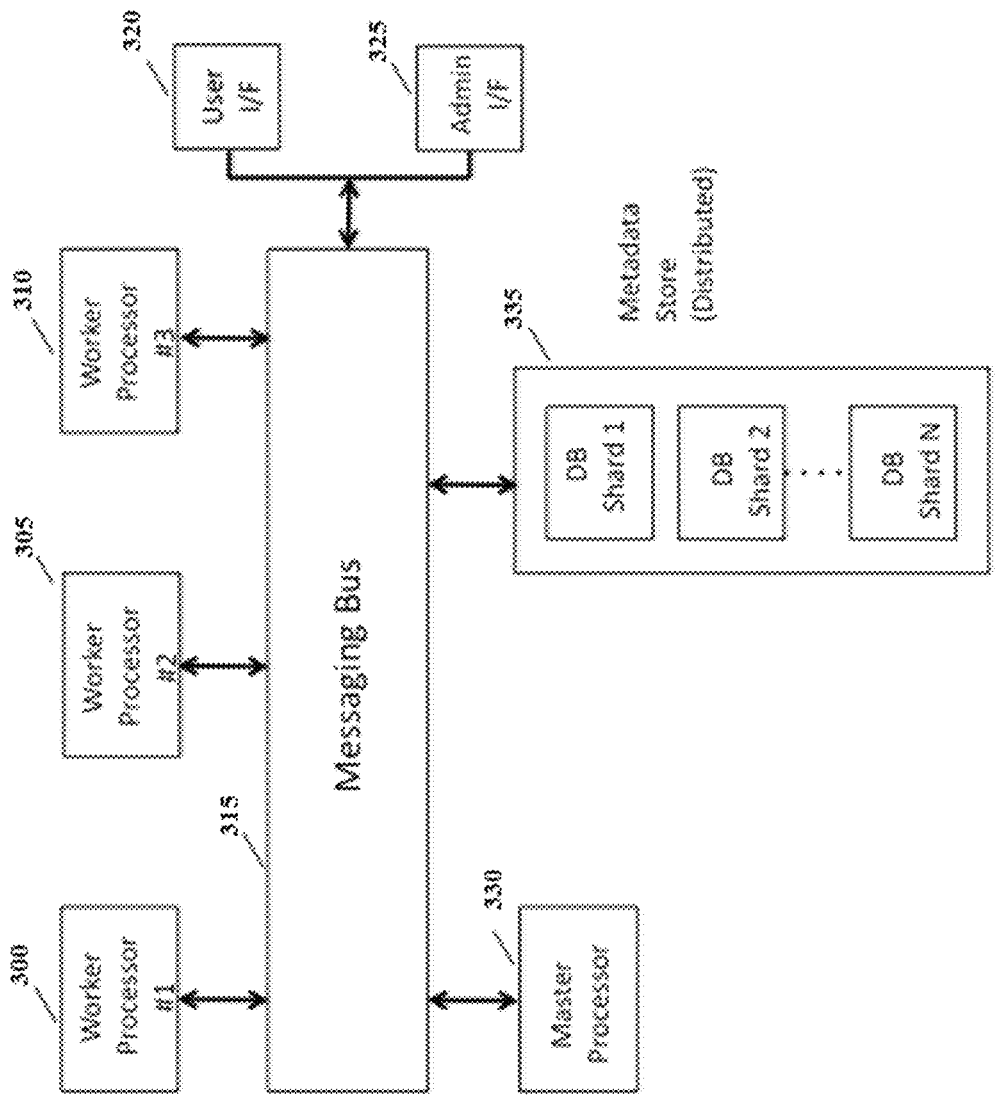
FIG. 3 illustrates a plurality of processors in a distributed computing system in accordance with some embodiments.

In an embodiment, the system's processing pipeline, as illustrated in FIG. 2, can be distributed on a plurality of computers as shown in FIG. 3.

The worker processors 300, 305 and 310 each run an instance of the file processing modules described in FIG. 2 at modules 200, 205, 210, 215, 220, and 230. Worker processors can be added as needed depending on processing load.

The master processor 330 runs the processing modules of a worker as well as the processing controller 225.

The metadata store 335 can be distributed across multiple computers, depending on processing load and database size, each computer containing a database shard. A database shard is a horizontal partition of data in a database. Each shard is held on a separate database server instance to spread the load.

This embodiment of the system allows for maintaining good processing performance and user interactivity regardless of the size of the metadata store 335.

Using the distributed processing configuration depicted in FIG. 3, the system performs cross-drive analysis on large amounts of data (e.g., 100's of TB) across a large number of drive images (e.g., over 1,000 media drive which can contain hundreds of millions of files) in raw binary format. The analysis performed by the system can process at high speeds (e.g., approximately 200 GB per hour on a cluster of three computers, containing 6 to 8 computing cores each and 64 GB of RAM).

Figure 4:
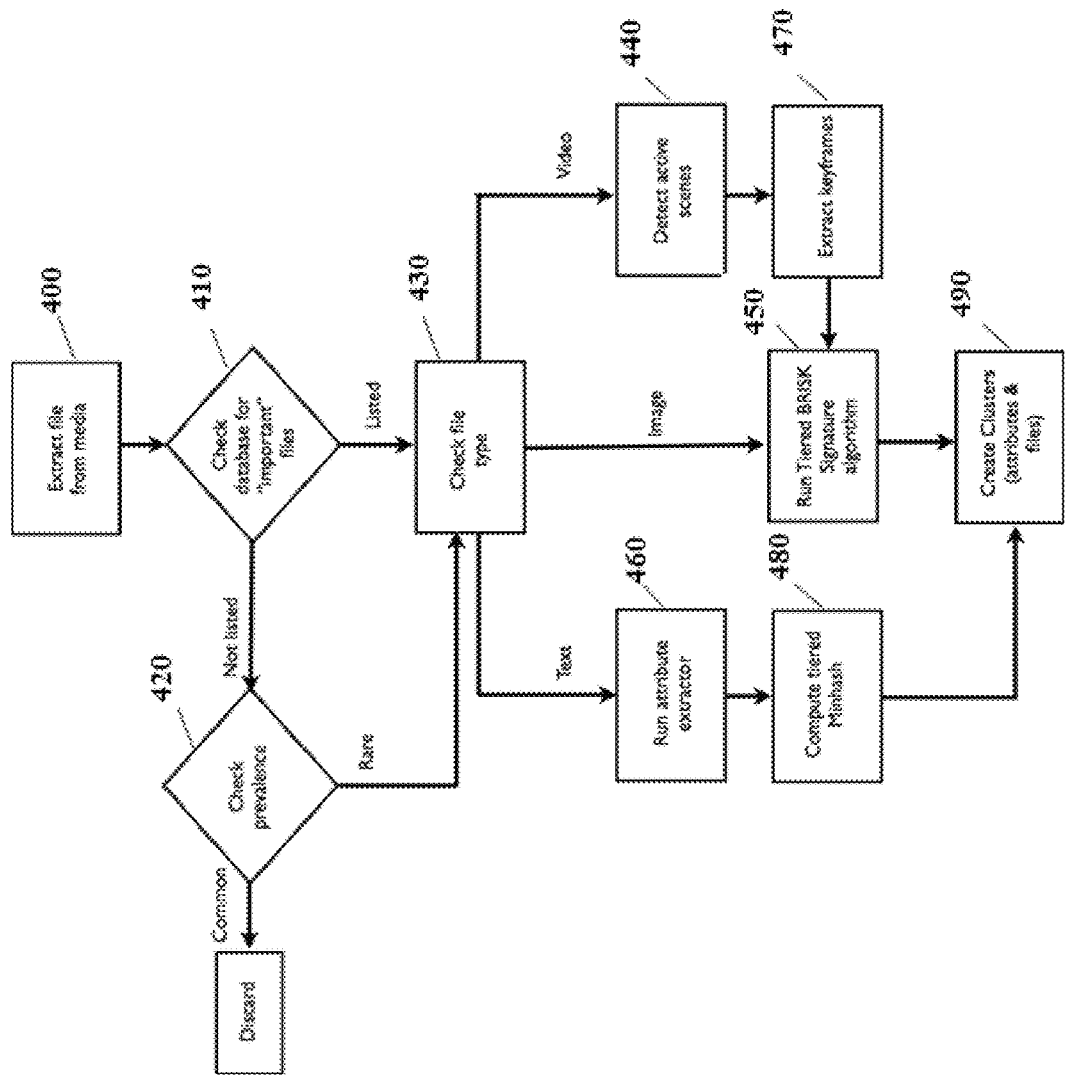
FIG. 4 is a process flow diagram of an exemplary method for use with the system of FIG. 2.

In operation, referring to FIG. 4, with further reference to FIG. 2, a process 400 in accordance with the disclosed subject matter is shown for performing similarity analysis of files (e.g., text, binary files, graphics, pictures, video, audio, images, etc.) extracted from one or many devices (400) (e.g., file servers, SANs, NAS devices, laptops and desktops running Windows, Mac and Linux, mobile devices, flash drives, external hard drives) that store, maintain or provide files to assess how similar two or more files are to each other or how similar a file is to a group/category. Process 400 can use the system shown in FIG. 2 and includes the steps set forth below Once data is extracted from the digital media, the system checks the data against a database of "important" files (410). In an embodiment, the system maintains a prevalence database on how often a file appears in all media drives processed. The prevalence database can be maintained also for file content attributes detected using regular expression string matching, such as credit card numbers, email addresses, phone numbers and social network service, for example. The prevalence database, which can be maintained within the Metadata Store 235, is used to exclude frequently occurring files and attributes from clusters. In an embodiment, common files (e.g., logo pictures from popular web sites) or common attributes (e.g., help@microsoft.com) will be excluded and only notable similarities among the files in multiple drives will remain.

If the files are not listed in the prevalence database, then the system checks for prevalence of such files (420). Files that are common are discarded since they are not of interest, and files that are rare continue through the processing pipeline. The system then checks for file type (430), e.g., text, image or video.

For text files, according to some embodiments, the Tiered Minhash module 210 applies a two stage Minhash algorithm to compute similarity based on various attributes, including, for example, file content, metadata and other attributes extracted from the file (460). An example of two similar files can be a first file that is sent by email from a sender to a receiver and a second file that is created when the receiver adds edits to the first file resulting in a slightly modified (similar) file.

Picture or image similarity can be computed in two stages (450), by the Tiered Brisk module 215, which includes applying the BRISK algorithm. According to this embodiment, the first stage clusters pictures based on shape similarity of objects depicted in the picture and the second stage eliminates pictures from the cluster that have color similarity below a certain threshold.

Video similarity consists of detecting activity scenes within the video and computing picture similarity over key frames extracted at the start of each activity sequence (440, 470). In an embodiment, the Video Activity Detector 220 takes a sequence of the video based on the scene activity and extracts key frames. The key frames are used for detecting image similarity. The Video Activity Detector module 220 can apply, for example, the SHOTDETECT algorithm as described above.

In an embodiment, the system can cluster files containing geo-references, such as those used by geographical information systems (GIS) and Geo-Positional Systems (GPS). The system processing pipeline illustrated in FIG. 2 can be expanded to include additional modules, not shown in FIG. 2, that are configured to apply extra algorithms such as the geo-reference similarity algorithm. This algorithm can extract geographical references in the content of files or within the file metadata. References can be names of places, cities and countries that can be converted to geo-coordinates by looking them up in a gazetteer database such as http://www.geonames.org/. Other geo-referenced files such as Google Earth files (.kml) and GPS files contain latitude and longitude coordinates. The similarity algorithm computes a polygon of geo-locations described in each file and compares the polygon to count how many vertices match.

In an exemplary embodiment, the File Clustering module 230 can perform a range of graph processing, including large-scale processing, by ensuring that as data is added incrementally to the graph, the growth does not deteriorate algorithm performance and interactive response. The graph is a data structure that captures the similarity among media drives. The vertices or nodes of the graph are the media devices, and the edges or links of the graph are the clusters with similar files shared between the media devices represented by the nodes or vertices connected by the link. Graph processing performance can be supported by the nature of the hashing algorithms that do not require all clusters to be recomputed when a new file is processed. The similarity metrics that can be used allow rapid sorting to determine to which cluster a file belongs by comparing the signature of the file to the highest and lowest signature values of the files already in each cluster. For example, a collection of 50,000 documents (30 GB of data) from 10 media drives are clustered by the system into about 30,000 clusters. The resulting graph consists of 10 vertices representing the 10 media devices and the 30,000 edges representing the clusters, resulting in a 10×30,000 graph.

An embodiment of the disclosed subject matter can incorporate file types and context into link analysis to identify files that are out of place given the use context of the source of files (e.g., server, desktop, laptop, external hard drive, mobile device, thumb drive). In particular, link analysis explores the connections among multiple device drives in terms of the clusters linking those drives. Through the user interface, the operator can set the file types of interest (e.g., word processing documents and emails) and dates (e.g., from Jan. 1, 2014 to Nov. 6, 2014) and visualize the corresponding graph of similar files accessed within those dates. Other graphs are possible selecting different media devices, file types (e.g., pictures and videos) and temporal filters.

The context of the file source is defined by the type of software programs and files stored in the file source. For example, a drive containing personal pictures, movies and music can, by the type of files and software programs installed, be associated with a home computer. A drive containing business presentations and financial spreadsheets can be associated with a business computer. Based on the context, a link analysis can identify typical files or unexpected files. For example, an office desktop computer used by administrative personnel containing Computer Aided Design (CAD) files associated with a specialized CAD tool application not installed on the computer drive can be an unexpected file based on the context. An embodiment can also identify rare or notable files that might have been exchanged by direct communication between individuals, as opposed to sharing files widely available on the web for downloading (common files vs. rare files), and it can differentiate between associations created by sharing files with the same name and different MD5 hash, or same MD5 hash with different file name (original files vs. duplicate files). Furthermore the system can differentiate and may incorporate associations on personal identifiers such as phone number, name and e-mail depending on how close together they occur (in-context vs. out-of-context references)

In an embodiment, the file clustering system modules are split into two parts, a file clustering server and file clustering clients. For example, all modules except for the file clustering module 230 can be part of the file clustering clients that run locally on the end-device where the data is stored. The local results are sent, in a compressed and secure form (with signature) to the file clustering server running remotely in a cloud computer server, for example. The file clustering server clusters the results with those of other end-devices in the file clustering module 230. One embodiment installs the local module of the system in all enterprise computers as an agent. If the agent does not report to the file clustering server at certain times when it is supposed to, the file clustering server sends an alert to the security IT personnel that the agent has possibly been disabled. The agent will be able to operate in various modes like gentle mode that runs only when the machine is not busy, or a more processing intensive mode that runs as fast as possible.

Figure 5:
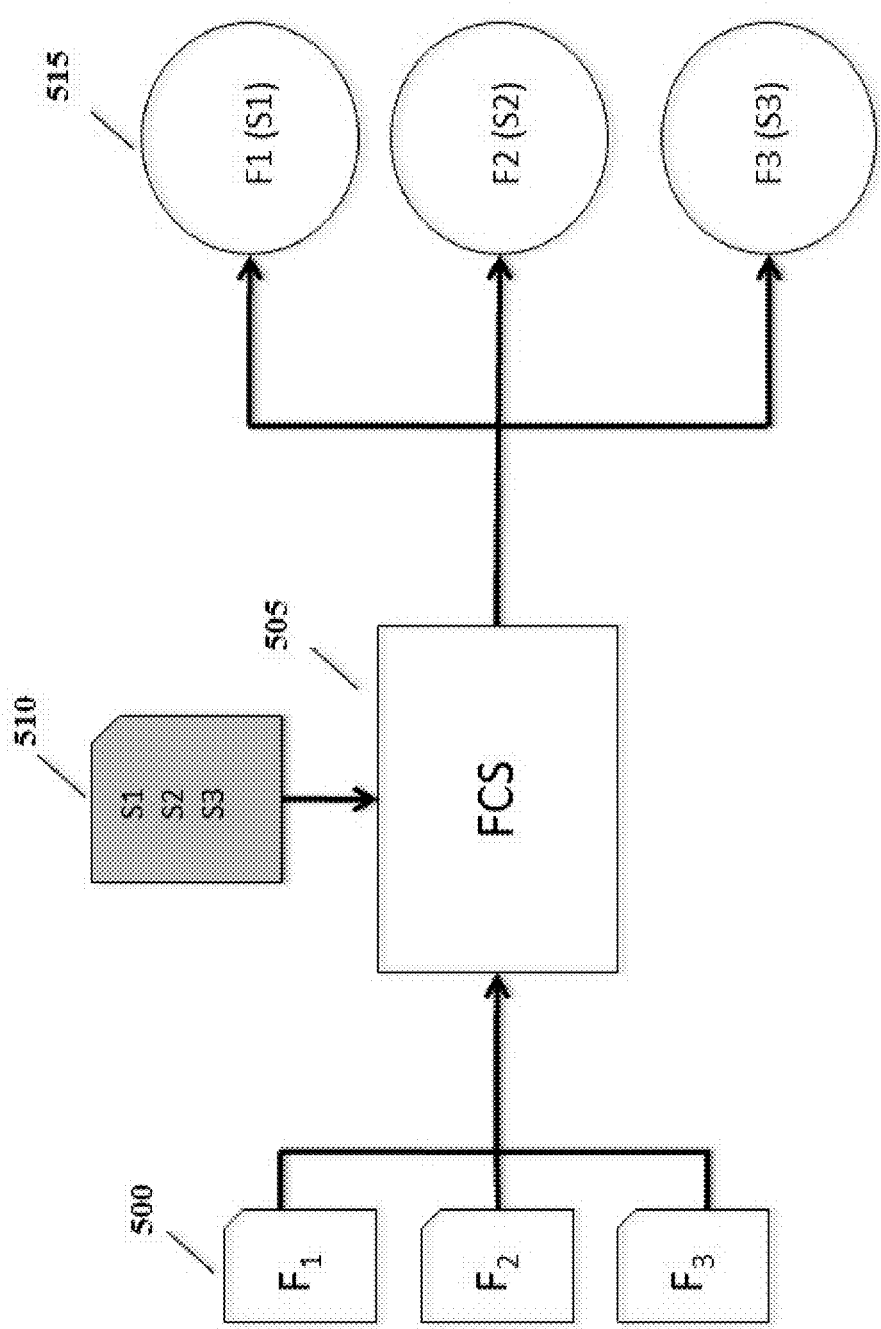
FIG. 5 is an embodiment of a sensitivity data application of the file clustering system shown in FIG. 2.

Protecting Sensitive Data in an Enterprise Environment:

FIG. 5 illustrates a sensitivity data application of the file clustering system shown in FIG. 2 in accordance with some embodiments of the disclosed subject matter. Representative files for each sensitivity level 510 (represented by S1, S2, S3) can be provided to the file clustering system 505. The system can then form clusters of similar files 515 from the files 500 input into the files clustering system 505. Other modules (not shown), such as preprocessors, can be used to automatically tag files based on keywords or other criteria. When the file is clustered it automatically inherits the tag of the cluster. For example, if a cluster is tagged "sensitive" and receives a file not tagged, the file automatically becomes tagged as "sensitive". This way in an enterprise environment, the enterprise can automatically tag its sensitive files based on a representative file set.

For each file, a sensitivity signature consisting of a tag indicating the cluster sensitivity level as well as a content-based signature consisting of top modules of the file term vector, appearing regular expression strings, and other tags indicating the presence of watch-listed terms can be composed. The sensitivity signature of each file can be logged into a database. The database can be indexed based on the files' hashing functions (e.g., SHA-1 and MD5 hashes) and when the database is queried for a file hashing function the file sensitivity signature is quickly returned. This can be used in an enterprise network by security professionals to determine the criticality of file activity monitoring events to assist in discerning which events have sensitive files associated with and attend to those first to mitigate data loss by insiders or cyber attacks.

Automatic Data Labeling

The processing engine can identify and tag data according to its content (e.g., sensitive data) and provide capability to inventory, monitor, and control the data appropriately. Sensitivity can be defined based on sensitive keyword lists, regular expressions, file similarity, content analytics and other criteria. The data tagging of the present disclosure can provide continuous and actionable visibility of sensitive data access, use and movement in context at all times. For example, if an email is sent to a number of recipients with a sensitive file attached to it, the email log will indicate the sender, recipients and the metadata of the attached file, such as its unique MD5. This information can be used to look up the sensitivity of the attached file and log the flow of the sensitive data from the sender to the recipients.

The processing engine can provide tags automatically based on clustering against a reference dataset of documents with known sensitivity tags, an end user's assessment or other criteria. In some embodiments, users can confirm or change a file's sensitivity status. A single labeling policy can be defined using both automated and manual assessments, allowing mixing and matching whatever methods to identify sensitive data. The file clustering system 505 can tag files with user defined tags (such as "interesting", "company sensitive", "customer proprietary", "company proprietary", "personal information" etc.). Tags (e.g., Abandoned", "Aged", "Active") can also be added automatically to files based on when the file was last accessed. Other tagging can include "Redundant," if a file has been found to be a duplicate of another one, "Risk-PII," if a file has been found to contain personal identifiable information, "Risk-IP," if a file is found to contain terms of company proprietary projects it can be tagged. Further, tags can indicate that the file hash matches an entry on a list such as the National Software Reference Library of hashes and metadata used in operating system and applications file identification, as well as other lists of files important to the corporation. In some embodiments of the disclosed subject matter, the file clustering system 505 tags files automatically using examples of tagged files. In addition, as other files get clustered to the ones provided as examples, the tags for the clusters are applied to all the files in the cluster.

Multi-layered tagging: In some embodiments of the disclosed subject matter, the processing engine has the ability to describe a file (e.g., an email) with several tags at the same time. Multi-layered classification can support advanced reporting analytics and can identify relationships between users, data and risk. Reporting analytics can include an understanding of how high-value data is used by users and/or confirm how policy enforcement (or lack thereof) affects security, compliance and productivity.

Inheritance tagging: In some embodiments of the disclosed subject matter, the processing engine automatically transfers classification tags between a source ("parent") file and derivative ("child") files, which share the parent's sensitivity (e.g., File A is Sensitive; File A is Saved as File B and slightly edited; then, File B is Sensitive). Inheritable tags can maintain consistent identification, usage auditing and policy enforcement among files of common content. For example, inheritable tags can increase visibility and/or control of sensitive content as it is passed along from file to file, allowing organizations to monitor, analyze and manage its life cycle with appropriate policies.

Case Application 1

In one embodiment, link associations can be used to help digital forensics case investigators. A processing engine of the disclosed subject matter can provide a graph of linked files in clusters to help users to pinpoint a select subset of relevant files with higher likelihood of evidentiary value. These files can then be used for further analysis. A file analysis engine can help identify relevant files (e.g., high payoff files) to start the investigation, improving the time to complete an investigation. For example, given five sets of media drives consisting of 40 to 50 drives and hundreds of thousands of files each, the file clustering system shown in FIG. 2 can be used to figure out, for example, how these sets of media drives are connected and whether there are any associations of value. The forensic investigator selects the sets and drives of interest that are uploaded into the file clustering system, which builds a graph of the file clusters using various similarities. The graph is presented to the investigator in ways that allow identifying associations among files across sets of media drives.

For example, the forensic investigator wants to explore links between two sets of drives named "Aqualung" and "Heavy Horses" only. On the graph view of the User I/F 240 the forensic investigator sees that both sets are linked. On the "drives" view the link analysis graph shows the volumes labeled "Jeff" belonging to the "Aqualung" set and the volume "George" belonging to the "Heavy Horses" set are connected. The forensic investigator wants to see why and how are they connected. To answer the why question, the investigator turns to the "clusters" view and sees that both volumes are connected by five clusters. Now to answer the how question, the investigator may obtain a quick view through a visual representation of the clusters, for example, as shown in FIGS. 6, 7, 8 and 9, that explains the importance of the similarities among files that lead to the common clusters. For example, the investigator can view that one cluster consists of five highly similar files (lexical similarity), another cluster consists of 10 files created around the same time (temporal similarity), another cluster shares files tagged with "financial information" (topic similarity), another cluster consists of encrypted files with the same MD5 hash (common encrypted files similarity). Other similarities can include computer program similarity and malware similarity.

In an embodiment, tags can be used by the investigator to label a node or link as having no investigative value, "NIV". In that way future investigations can exclude all associations labeled "NIV".

The graph view allows the investigator to explore out from a given link into other drives and sets of drives not selected as part of the initial analysis. The initial graph shows a media drive labeled "Rebecca" not connected to "George" as one filter setup eliminates the cluster or clusters shared among them and another labeled "Ginger" connected to George via 6 clusters. The investigator wants to quickly explore if these unusual connections are of any value (e.g., which clusters are useful?). The investigator, from the graph view, can double click on "Rebecca" and "Ginger" and add those drives into the analysis.

Case Application 2

In another embodiment, the system of the present disclosure can track sensitive information flows using the sensitivity data application of the file clustering system shown in FIG. 5. For example, organizations can generate a huge number of electronic files. Some of these files may contain sensitive or confidential information that organizations would like to protect. Sensitive data (e.g., financial data, operation plans, R&D projects and software source code, intellectual property, client and partner confidential information, etc.) may be produced and stored across a large variety of devices on the organization network. The system can allow organizations to label their electronic files and tag the sensitivity of large number of documents, so that appropriate security can be applied to their files.

Tags can also be added by the system based on file location, file owner, file metadata, file content or other criteria. Once documents are labeled, the system can implement procedures to protect sensitive information and to track its flow across systems and users.

The sensitivity data application of the file clustering system shown in FIG. 5 can learn which files are sensitive, and filter the reports produced by file activity auditing tools such that a user of the system can focus on abnormal activity that may be indicative of internal or external threats. This can reduce the "noise" caused by non-relevant activity and increase detection of threats.

The file clustering system shown in FIG. 5 can use a broad pipeline of similarity algorithms that increase the general quality (e.g., accuracy, reliability, automatic recognition) of detection of sensitive information of sensitive content. The system can identify exact matches and/or near duplicates and cases of simple changes to file contents.

The file clustering system shown in FIG. 5 can build a live inventory of sensitive files that indicates what is stored and where in the form of an interactive heat map showing which storage devices contain sensitive information and can represent visually, or in another format, where devices containing sensitive information are located in the network. The system can represent visually the distribution of sensitive files for a device on the network (e.g., servers, laptops).

Although the disclosed subject matter has been described and illustrated in the foregoing embodiments, it is understood that the present disclosure has been made only by way of example, and that numerous changes in the details of implementation of the disclosed subject matter may be made without departing from the spirit and scope of the disclosed subject matter.

The systems and methods for file clustering, multi-drive forensic analysis and data protection are not limited in its application to the details of process and to the arrangements of the modules set forth in the above description or illustrated in the drawings. The disclosed subject matter is capable of other embodiments and of being practiced and carried out in various ways. Also, it is to be understood that the phraseology and terminology employed herein are for the purpose of description and should not be regarded as limiting. Moreover, certain features, which are well known in the art, are not described in detail in order to avoid obscuring the description of the disclosed subject matter.

In some embodiments of the disclosed subject matter, the software needed for implementing a process or a database includes a high level procedural or an object-orientated language such as C, C++, C#, Java, Python, or Perl. The software may also be implemented in assembly language if desired. The language can be a compiled or an interpreted language. Packet processing implemented in a server includes any processing determined by the context. For example, packet processing may involve high-level data link control (HDLC) framing, header compression, and/or encryption. In some embodiments of the disclosed subject matter, the software is stored on a storage medium or device such as read-only memory (ROM), programmable-readonly memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

As such, those skilled in the art will appreciate that the conception, upon which this disclosure is based, may readily be utilized as a basis for the designing of other methods and systems for carrying out the several purposes of the present disclosed subject matter. It is important, therefore, that the disclosed subject matter be regarded as including equivalent process to those described herein insofar as they do not depart from the spirit and scope of the present disclosed subject matter.

For example, the specific sequence of the described process may be altered so that certain processes are conducted in parallel or independently, with other processes, to the extent that the processes are not dependent upon each other. Thus, the specific order of steps and/or functions described herein is not to be considered implying a specific sequence of steps to perform the process. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present disclosure.

The invention claimed is:

1. A multi-drive forensic data analysis system comprising:
    a plurality of memory devices having files stored thereon;
    at least one module configured to receive the files stored on the plurality of memory devices and extract characteristics of the files stored on the plurality of memory devices;
    a clustering module configured to:
        receive the extracted characteristics;
        identify similarities between the files stored on the plurality of memory devices, based on the extracted characteristics, using a two-stage algorithm wherein at least one stage of the two-stage algorithm includes content-based hashing;
        generate file clusters based on the identified similarities among the files stored on the plurality of memory devices; and
        generate a visual representation of the memory devices and connections therebetween based on the identified similarities among the files stored on the plurality of memory devices, the visual representation comprising: nodes that correspond to the memory devices; and lines connecting the nodes, each of the lines having a thickness representing the identified similarities; and
    a user interface module for displaying the visual representation.

2. The system of claim 1 further including a tagging module configured to tag files based on the identified similar characteristics and further configured to tag clusters based on the file tags.

3. The system of claim 2 wherein the user interface module is configured to allow users to filter the visual representation of the file clusters based on at least one of the file tags and cluster tags.

4. The system of claim 1 wherein the characteristics include one or more of the following: content hashes, keywords, regular expressions, and metadata.

5. The system of claim 1, wherein the identified similarities corresponds to the respective numbers of similar files.

6. The system of claim 1 wherein the extracted characteristics comprise at least one content hash and wherein the clustering module is further configured to perform hashing functions iteratively on the files to identify a set of possible similar files thereby reducing the number of false positives.

7. The system of claim 6, wherein the clustering module is configured to perform hashing functions iteratively on the files to identify a set of possible similar files is further configured to generate a term vector for each one of the set of possible similar files, wherein the term vector includes an array of terms within a file and a corresponding frequency of each term in the array in the file.

8. The system of claim 7, wherein the clustering module is further configured to perform a pairwise comparison of the term vectors for each one of the set of possible similar files.

9. The system of claim 1 wherein the number of extracted characteristics is adjustable.

10. The system of claim 1, wherein the files comprise at least one of text, images or video.

11. The system of claim 1 wherein the clustering module is further configured to identify similarities among files stored on the plurality of memory devices.

12. The system of claim 1 wherein the clustering module is further configured to identify similarities among the plurality of memory devices by identifying similarities among the files stored on the plurality of memory devices.

13. The system of claim 1 wherein the clustering module is further configured to identify similarities among files stored on one of the plurality of memory devices and a remainder of the plurality of memory devices.

14. The system of claim 1 wherein the clustering module is further configured to rank file clusters based on one or more of a score assigned to the files or at least one attribute of the files of the file clusters.

15. The system of claim 1, further comprising a master processor and a plurality of worker processors, wherein the module extracting characteristics and the clustering module are distributed on the plurality of worker processors, wherein the master processor allocates processing tasks to the plurality of worker processors.

16. The system of claim 1, wherein one of the extracted characteristics is a geo-reference, and wherein the clustering module is further configured to generate file clusters based on the geo-reference.

17. The system of claim 1, wherein the content-based hashing includes at least one of a Minhash algorithm and a BRISK algorithm.

18. A multi-drive forensic data analysis system comprising:
    a plurality of memory devices having files stored thereon;
    a memory storing a reference set of files including one or more sensitivity designations based on one or more characteristics of the reference set of files;
    a processor configured to:
        identify and cluster the plurality of files stored on the plurality of memory devices based on the one or more characteristics between the plurality of files and one or more files from the reference set of files using a two-stage algorithm wherein at least one stage of the two-stage algorithm includes content-based hashing;

tag the plurality of files stored on the plurality of memory devices with the same sensitivity designation as one or more of the files from the reference set; and generate a visual representation of the memory devices and connections therebetween based on the sensitivity designations of the files and which one of the plurality of memory devices the files are stored on, the visual representation comprising: nodes that correspond to the memory devices; and lines connecting the nodes, each of the lines having a thickness representing the identified similarities, and a user interface module for displaying the visual representation.

19. The system of claim 18, wherein each file in a cluster inherits the tag of the cluster.

20. The system of claim 18 wherein sensitivity designations are based on at least one of sensitive keyword lists, regular expressions, file similarity, and content analytics.

21. The system of claim 18, wherein the processor is further configured to tag based on clustering against a reference dataset of documents with assigned sensitivity tags.

22. The system of claim 18, wherein the processor is further configured to update the visual representation when new files are added.

23. The system of claim 18, wherein the content-based hashing includes at least one of a Minhash algorithm and a BRISK algorithm.

* * * * *